United States Patent
Lee

(10) Patent No.: US 6,393,881 B1
(45) Date of Patent: May 28, 2002

(54) LOCK STRUCTURE FOR MANUAL SHIFT LEVERS

(75) Inventor: Chun-Chang Lee, Taipei (TW)

(73) Assignee: Tung Chu International Inc., Taipei (TW)

(*) Notice: Subject to any disclaimer, the term of this patent is extended or adjusted under 35 U.S.C. 154(b) by 18 days.

(21) Appl. No.: 09/726,321

(22) Filed: Dec. 1, 2000

(51) Int. Cl.$^7$ ............................ B60K 25/06; E05B 65/12
(52) U.S. Cl. ............................. 70/247; 70/386; 70/201
(58) Field of Search ..................... 70/201, 386, 247, 70/195, 197, 202

(56) References Cited

U.S. PATENT DOCUMENTS

| | | | | |
|---|---|---|---|---|
| 4,901,544 A | * | 2/1990 | Jang | 70/218 |
| 5,473,918 A | * | 12/1995 | Hixon | 70/202 |
| 5,596,894 A | * | 1/1997 | Lee | 70/201 |
| 6,098,431 A | * | 8/2000 | Li | 70/195 |
| 6,116,370 A | * | 9/2000 | Puigbo | 180/287 |

FOREIGN PATENT DOCUMENTS

DE             3702479 A1 * 6/1987 .................. 70/247

* cited by examiner

Primary Examiner—Lynne H. Browne
Assistant Examiner—John B. Walsh
(74) Attorney, Agent, or Firm—Bacon & Thomas, PLLC

(57) ABSTRACT

A manual shift lever lock structure, wherein: a second hollow pipe is slipped over the shift lever, a lock cylinder is fixedly connected to the top of the shift lever to move the second hollow pipe, the first hollow pipe and the slide sleeve are slipped over the second hollow pipe, a tailing member is provided at the end of the first hollow pipe and has thereon an elastic member; the first hollow pipe has a hole for inserting therein a bead; a first annular recess and a second annular recess are respectively provided in the inner wall of the slide sleeve and the external wall of the second hollow pipe, thereby the bead drops into the first annular recess of the slide sleeve when the slide sleeve is pulled down to insert into a hole of a shift lever seat, and the slide sleeve is stopped here in engagement with the shift lever seat; and when in unlocking the shift lever, the second hollow pipe is moved and the bead drops into the space of the second annular recess of the second hollow pipe, the slide sleeve is pulled upwardly by the elastic member to snap up to render the shift lever to be in a state of unlocking.

6 Claims, 5 Drawing Sheets

US 6,393,881 B1

LOCK STRUCTURE FOR MANUAL SHIFT LEVERS

BACKGROUND OF THE INVENTION

1. Field of the Invention

The present invention is related to a manual shift lever lock structure used to restrain the shift lever from being pushed into a gear position randomly by engagement provided between the shift lever and a seat of the shift lever; and especially to a manual shift lever lock structure with which the lock can be directly provided on the manual shift lever without changing the elements of the shift lever.

2. Description of the Prior Art

Conventional theft-proof devices, in addition to being in need of the theft-proofing function provided on door locks or power door locks of cars to prevent stealing the articles and activating the circuits in the cars, need the function of, by cooperation of other theft-proof locks, avoiding stealing of cars easily by driving away after destroying the door locks or power door locks. Generally, in normal driving of a car, a gear shifting mechanism shifts the gears of the car to a position to be driven by a transmission shaft to have the car driven by its own power. If the shift lever of the car is locked to prevent it from being shifted into a gear position, the engine of the car (even it is running) cannot make the car move. This can make it difficult for a to steal the car and provides more powerful measures to prevent the car from being stolen.

A lock with a U shaped rod is available in the markets presently; it can loop the shift lever and can restrain the shift lever. However, the U shaped rod is a locking member inserted from outside, the lock is separated from the shift lever, thus is subjected to destruction without damaging the shift lever and is unable to provide an effective theft-proofing function. Furthermore, when a user is to open the lock, the U shaped rod must be pulled and inserted for several times, thus inconvenience of use is induced; and even the U shaped rod may get lost.

SUMMARY OF THE INVENTION

Therefore, the primary object of the manual shift lever lock structure of the present invention is to provide a slide sleeve capable of engaging with the seat of the shift lever and being slipped over a first hollow pipe of the shift lever; thus the shift lever is restrained from being pushed into a gear position randomly, and the car cannot be normally driven and an effective theft-proofing function is obtained. When an operator wants to lock the shift lever, he can just pull down the slide sleeve to slip into a hole on the seat for the shift lever; on the contrary, when he wants to release locking of the shift lever, he can just open the lock cylinder to render it automatically skip out of the shift lever seat, then engagement between the slide sleeve and the shift lever can thus be relieved. In this way, opening and locking of the lock can be simpler and more convenient.

Another object of the manual shift lever lock structure of the present invention is to combine the lock structure with the main body structure of the shift lever to more effectively prevent the lock from destruction, thus the theft-proofing function of the lock can be elevated.

Another object of the manual shift lever lock structure of the present invention is to extend and form an insertion rod on the wall of the slide sleeve, and an insertion hole is formed on the shift lever seat, by insertion engagement of the insertion rod in the shift lever seat, the shift lever is engaged by the shift lever seat. The lock structure can suit any shift lever seat of various types.

The present invention will be apparent in its detailed structure, features and functions after reading the detailed description of the preferred embodiment thereof in reference to the accompanying drawings.

DETAILED DESCRIPTION OF THE PREFERRED EMBODIMENT

Figure 1:
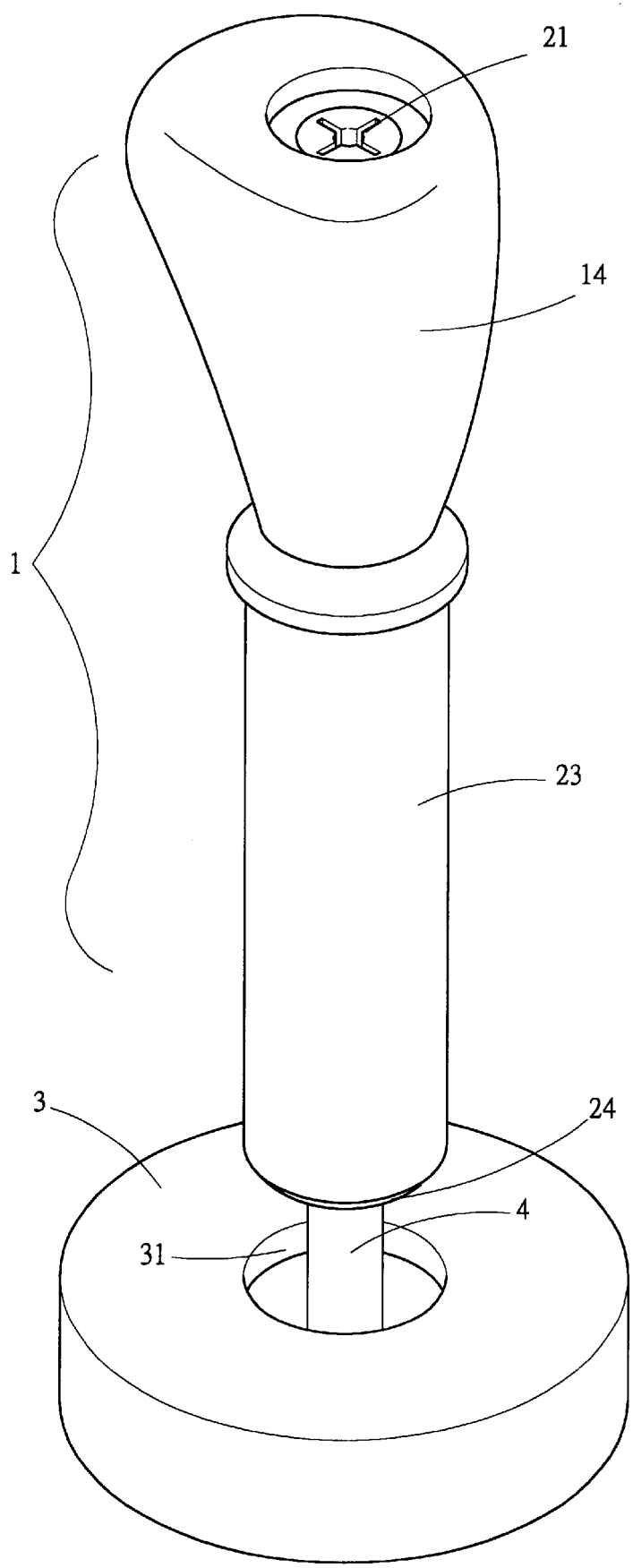
FIG. 1 is a perspective view of a preferred embodiment of the present invention.
Figure 2:
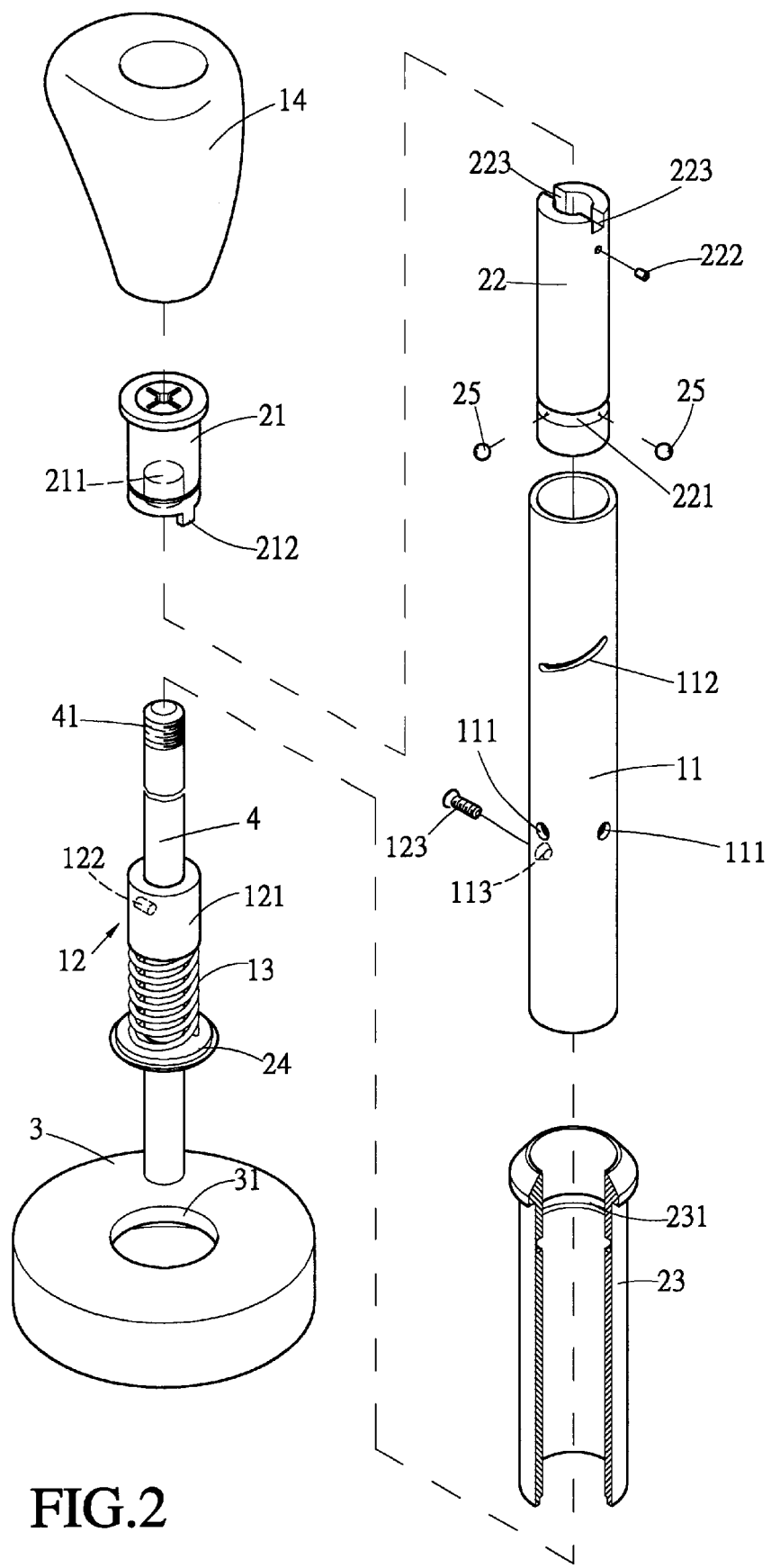
FIG. 2 is an analytic perspective view showing the structure of the present invention.

Referring to FIGS. 1 and 2 showing respectively the appearance of a preferred embodiment and an analytic structural perspective view of the manual shift lever lock structure of the present invention, wherein, the shift lever lock 1 has a first hollow pipe 11 as a main body for mounting therein the lock structure, the whole shift lever lock 1 has a second hollow pipe 22 controllable by a lock cylinder 21 and slipping in the first hollow pipe 11. The first hollow pipe 11 of the shift lever lock 1 is provided thereover a slide sleeve 23 capable of linking up with the second hollow pipe 22, and is provided at the end of the first hollow pipe 11 with a tailing member 12. The slide sleeve 23 can be slipped in a hole 31 of a shift lever seat 3 to form engagement therewith, thus a shift lever 4 which is the same as a conventional shift lever is restrained from being pushed into a gear position randomly and theft-proofing function of the lock can be obtained. The whole structure of the shift lever lock 1 can be provided on the upper end of the shift lever 4 having a knob 14 too for holding by a user.

Figure 3:
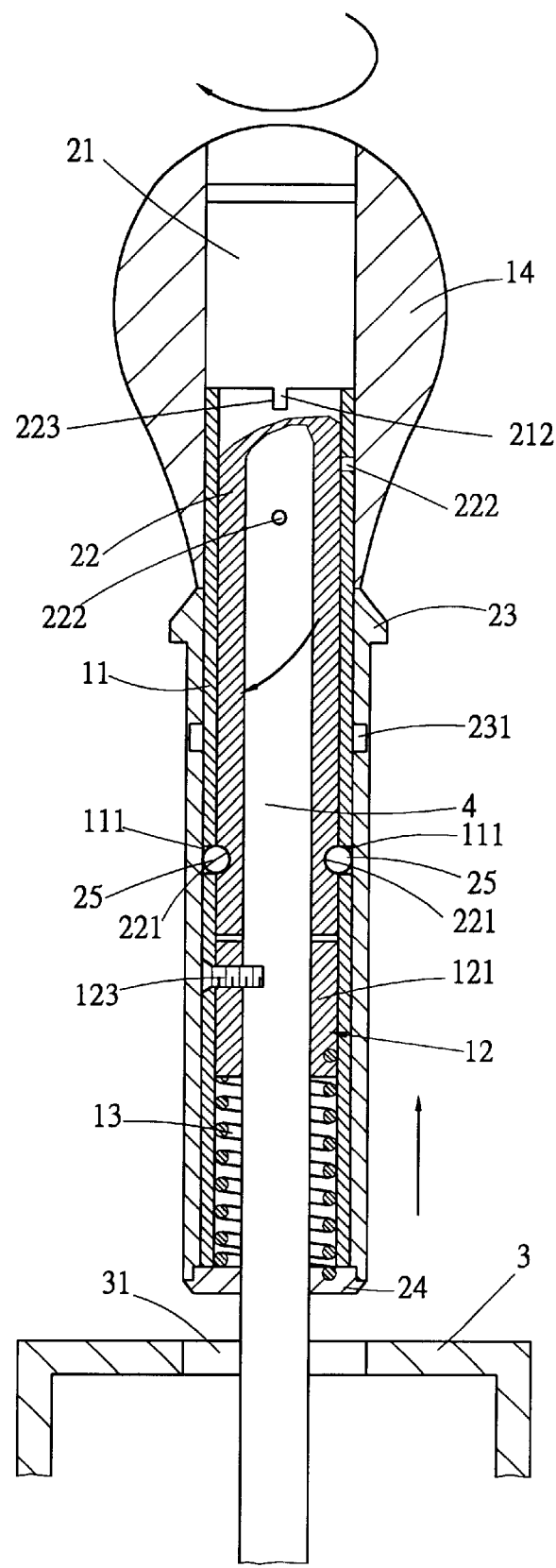
FIG. 3 is a sectional view showing the lock of the present invention in an opening state.

Referring simultaneously to FIGS. 2 and 3, wherein, the tailing member 12 of the shift lever lock 1 is provided on the top thereof with a cylindrical block 121 able to engage with the shift lever 4, the cylindrical block 121 of the tailing member 12 is extended into the first hollow pipe 11 to about half the length of the latter. A screw 123 is extended through a lock hole 113 on the wall of the first hollow pipe 11 and then is locked into a screw hole 122 on the wall of the cylindrical block 121 to firmly connect and lock with the shift lever 4. An elastic member 13 is provided on the tailing member 12, in the embodiment, the elastic member 13 is a stretchable spring, one end thereof is directly fixedly connected with the cylindrical block 121 of the tailing member 12; the other end thereof is fixedly connected with an end cap 24 able to cover the lower end of the slide sleeve 23. The lock cylinder 21 of the shift lever lock 1 is fixedly connected in the knob 14 and is provided on the bottom thereof with a lock hole 211 to allow a threaded section 41 on the top of the shift lever 4 to be screwed in and to connect integrally with the shift lever 4. The second hollow pipe 22 is inserted and placed between the first hollow pipe 11 and the shift lever 4 but beneath the tailing member 12. A beveled guide slot 112 is formed on the wall of the first hollow pipe 11; and a guide pin 222 is fixedly inserted in the second hollow pipe 22 at a location corresponding to that of the beveled guide slot 112. The guide pin 222 can be inserted into the beveled guide slot 112 to render the second hollow pipe 22 to displace up and down when in rotating. The second hollow pipe 22 is provided on the top thereof with a cut 223 for insertion of a tongue 212 on the lock cylinder 21 and is rotated by moving the tongue 212. And the first hollow pipe 11 of the shift lever lock 1 is provided with a hole 111 for inserting therein a bead 25. A first annular recess 231 and a second annular recess 221 are respectively provided in the inner wall of the slide sleeve 23 and the external wall of the second hollow pipe 22, thereby the bead 25 can be embedded in the hole 111 of the first hollow pipe 11 and between the external wall of the second hollow pipe 22 and the first annular recess 231 of the inner wall of the slide sleeve 23, or can be embedded in the hole 111 of the first hollow pipe 11 and between the inner wall of the slide sleeve 23 and the second annular recess 221 of the second hollow pipe 22. In this mode, the slide sleeve 23 can be engaged and released.

Figure 4:
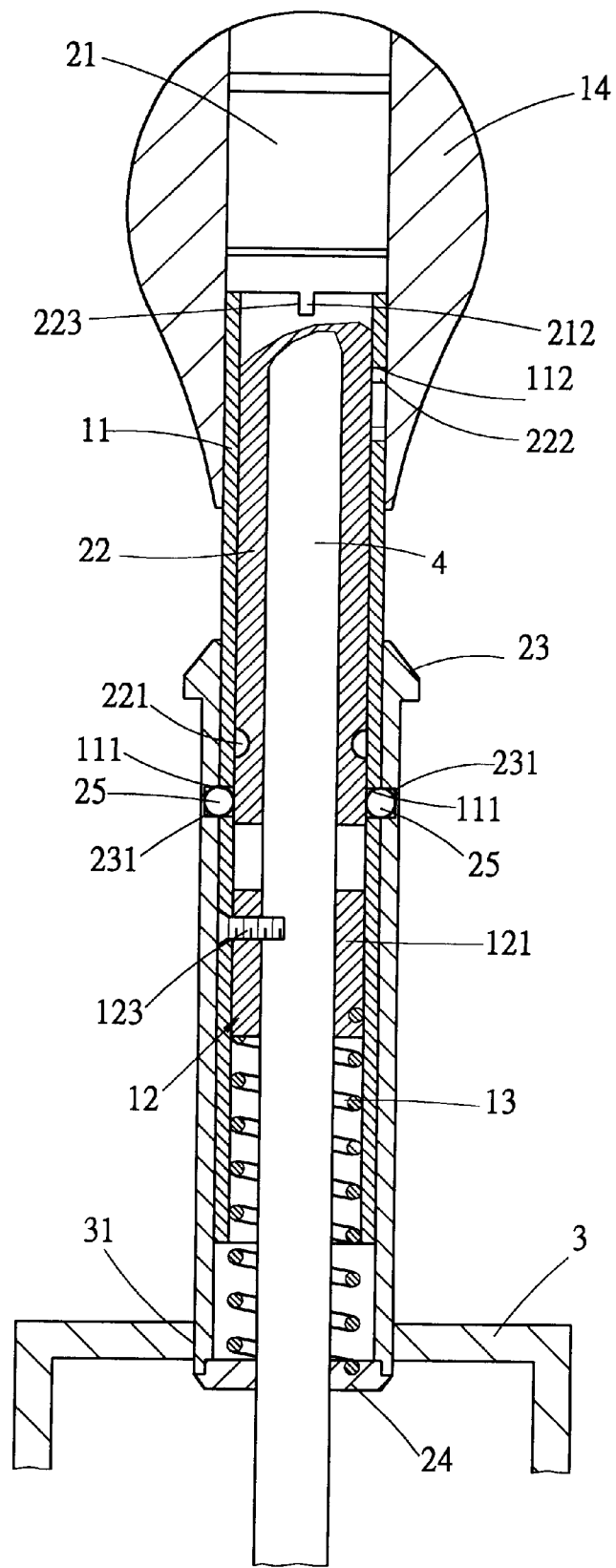
FIG. 4 is a sectional view showing the lock of the present invention in a locking state.

The way of movement of the whole lock of the present invention is as shown in FIGS. 3 and 4. Referring to FIG. 3 in the first place, the whole lock is in the state of opening, when an operator is to lock the shift lever 4, the lock cylinder 21 of the lock is in a state having the second hollow pipe 22 moved to an upper position. At this state, it needs only to pull down the slide sleeve 23 to insert it into the hole 31 of a shift lever seat 3 as shown in FIG. 4, to make alignment of the first annular recess 231 of the inner wall of the slide sleeve 23 with the hole 111 of the first hollow pipe 11; then the bead 25 can drop into the space between the slide sleeve 23 and the hole 111; so that the slide sleeve 23 is stopped here in engagement with the shift lever seat 3, thus the shift lever 4 is unable to move and a function of locking is obtained. When the operator is to unlock the shift lever 4 as is shown in FIG. 3, the second hollow pipe 22 can be moved by the tongue 212 to make alignment of the second annular recess 221 on the external wall of the second hollow pipe 22 with the hole 111 of the first hollow pipe 11; then the bead 25 can drop into the space of the second annular recess 221 of the second hollow pipe 22. By aiding of the function that the end cap 24 at the lower end of the slide sleeve 23 is pulled upwardly by the elastic member 13, the bead 25 can surely drop into the space of the second annular recess 221 of the second hollow pipe 22 to release the engagement against the slide sleeve 23. Now the slide sleeve 23 can snap up by stretching of the elastic member 13 to get off the hole 31 of a shift lever seat 3, and thereby the shift lever 4 is in the state of unlocking.

Figure 5:
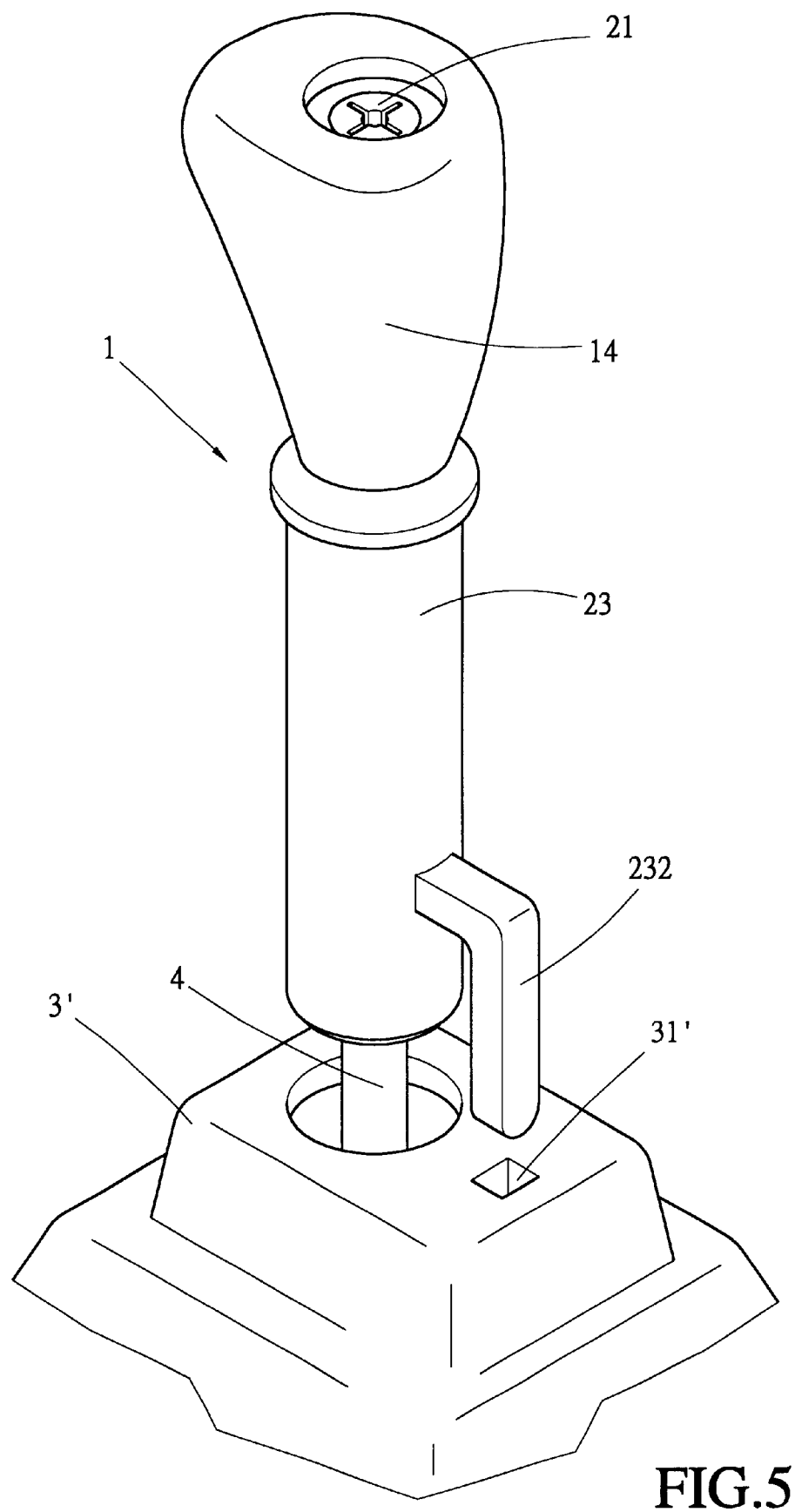
FIG. 5 is a perspective view showing the appearance of another embodiment of the present invention.

Further as shown in FIG. 5 which is a perspective view showing the appearance of another embodiment of the present invention, wherein, an insertion rod 232 is provided on the wall of the slide sleeve 23 to match with an insertion hole 31' of a shift lever seat 3'. When the slide sleeve 23 is pulled down, insertion connecting of the insertion rod 232 with the insertion hole 31' makes the shift lever 4 engaged in the shift lever seat 3'. This also suits other different structures of shift lever seat.

The manual shift lever lock structure of the present invention further restrains the shift lever lock from being pushed into a gear position randomly by providing the slide sleeve enveloping the shift lever for engagement with the shift lever seat, thereby, the car can not be well driven and the lock structure can get an effective theft-proofing function. When the user is to lock the shift lever, he needs only to insert a key into the lock cylinder, and rotate it to a suitable orientation, and then pull down the slide sleeve to slip in the hole of the shift lever seat. On the contrary, when the user is to unlock the shift lever, he needs only to unlock the lock cylinder to have the slide sleeve to be rejected automatically from the shift lever seat; then the shift lever can be released from engagement with the slide sleeve. Thereby, locking and unlocking are both simple and convenient. The design having the whole lock combined with the main body structure of the shift lever renders destruction of the lock to be prevented more effectively. This provides a preferred way to assure effectiveness of the manual shift lever lock structure.

Having thus described my invention, what I claim as new and desire to be secured by Letters Patent of the United States are:

1. A manual shift lever lock structure comprising a lock cylinder, a first hollow pipe, a second hollow pipe, a slide sleeve and a tailing member, said structure is characterized by:

said second hollow pipe is slipped over a shift lever, said lock cylinder is fixedly connected to the top of said shift lever for moving said second hollow pipe, said first hollow pipe and said slide sleeve are slipped over said second hollow pipe, said tailing member is provided at the end of said first hollow pipe and is provided thereon with an elastic member; said first hollow pipe is provided with a hole for inserting therein a bead; a first annular recess and a second annular recess are respectively provided in the inner wall of said slide sleeve and the external wall of said second hollow pipe, thereby said bead drops into said first annular recess of said slide sleeve when said slide sleeve is pulled down to insert into a hole of a shift lever seat, and said slide sleeve is stopped here in engagement with said shift lever seat; and when in unlocking said shift lever, said second hollow pipe is moved and said bead drops into the space of said second annular recess of said second hollow pipe, said slide sleeve is pulled upwardly by said elastic member to snap up to render said shift lever to be in a state of unlocking.

2. A manual shift lever lock structure as claimed in claim 1, wherein, said tailing member of said shift lever lock is provided on the top thereof with a cylindrical block able to engage with said shift lever, said cylindrical block is extended into said first hollow pipe to about half the length of the latter, a screw is extended through a lock hole on the wall of said first hollow pipe and then is locked into a screw hole on a lateral wall of said cylindrical block to firmly connect and lock with said shift lever.

3. A manual shift lever lock structure as claimed in claim 1, wherein, said lock cylinder is fixedly connected in a knob and is provided on the bottom thereof with a lock hole to allow a threaded section on the top of said shift lever to be screwed in and connected integrally with said shift lever; said second hollow pipe is inserted and placed between said first hollow pipe and said shift lever but beneath said tailing member, a beveled guide slot is formed on the wall of said first hollow pipe, and a guide pin is fixedly inserted in said second hollow pipe at a location corresponding to that of said beveled guide slot, said guide pin is inserted into said beveled guide slot to render said second hollow pipe to displace up and down when in rotating.

4. A manual shift lever lock structure as claimed in claim 3, wherein, said second hollow pipe is provided on the top thereof with a cut for insertion of a tongue on said lock cylinder and is rotated by moving of said tongue.

5. A manual shift lever lock structure as claimed in claim 1, wherein, said elastic member is a stretchable spring.

6. A manual shift lever lock structure as claimed in claim 1, wherein, an insertion rod is provided on the wall of said slide sleeve to match with an insertion hole provided on said shift lever seat.

* * * * *